US012312920B1

(12) United States Patent
Foster

(10) Patent No.: US 12,312,920 B1
(45) Date of Patent: May 27, 2025

(54) METHOD AND SYSTEM FOR RECOVERING, PROCESSING, AND TRANSPORTING SAND FOR WELL FRACTURING

(71) Applicant: Brandon R. Foster, Midland, TX (US)

(72) Inventor: Brandon R. Foster, Midland, TX (US)

( * ) Notice: Subject to any disclaimer, the term of this patent is extended or adjusted under 35 U.S.C. 154(b) by 0 days.

(21) Appl. No.: 18/924,407

(22) Filed: Oct. 23, 2024

(51) Int. Cl.

| | |
|---|---|
| ***E21B 43/08*** | (2006.01) |
| ***B03B 9/00*** | (2006.01) |
| ***E21B 43/26*** | (2006.01) |
| *B07B 1/00* | (2006.01) |

(52) U.S. Cl.

CPC ................ *E21B 43/08* (2013.01); *B03B 9/00* (2013.01); *E21B 43/2607* (2020.05); *B07B 1/00* (2013.01)

(58) Field of Classification Search

CPC ...... E21B 43/2607; E21B 43/34; E21B 43/35; E21B 43/385; E21B 43/40; B03B 5/00; B03B 5/04; B03B 7/00; B03B 11/00

See application file for complete search history.

(56) References Cited

U.S. PATENT DOCUMENTS

| | | | | |
|---|---|---|---|---|
| 10,378,326 | B2 * | 8/2019 | Morris | F16D 48/062 |
| 11,465,155 | B1 * | 10/2022 | Mitchell | B03B 5/04 |
| 11,519,252 | B2 * | 12/2022 | Kramer | C09K 8/80 |
| 11,987,753 | B2 * | 5/2024 | Fisher | E21B 43/2607 |
| 2010/0132949 | A1 * | 6/2010 | DeFosse | B01F 23/53 166/308.1 |
| 2020/0223346 | A1 * | 7/2020 | Welch | B65D 88/129 |
| 2022/0356790 | A1 * | 11/2022 | Kramer | E21B 43/26 |
| 2022/0380246 | A1 * | 12/2022 | Li | C03C 1/022 |

* cited by examiner

*Primary Examiner* — Joseph C Rodriguez

(74) *Attorney, Agent, or Firm* — Dennis D. Brown; Brown Patent Law, P.L.L.C.

(57) ABSTRACT

A method and system for recovering, processing, and transporting sand for well fracturing operations. The method and system (i) deliver the sand from a sand source location to a remote site of distribution or use via a sand slurry pipeline which also produces a high level of attrition for liberating clay from the sand, (ii) eliminate the need to use an attrition scrubber for removing the clay, and (iii) reduce fuel consumption and emissions, and provide greater safety, by eliminating the need to transport the sand using trucks which must be driven long distances over hazardous routes.

18 Claims, 1 Drawing Sheet

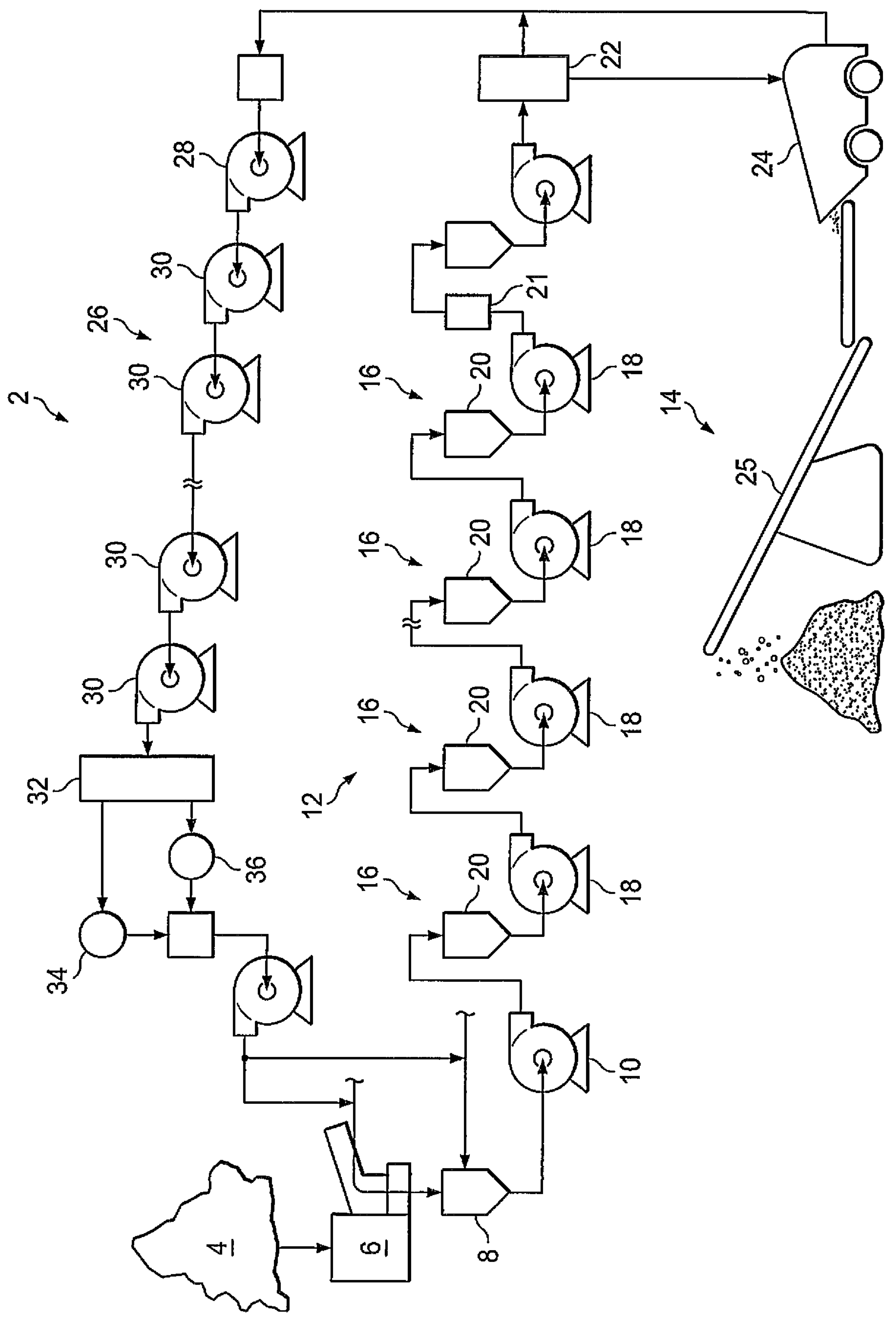
2
4
6
8
10
12
14
16
18
20
21
22
24
25
26
28
30
32
34
36

METHOD AND SYSTEM FOR RECOVERING, PROCESSING, AND TRANSPORTING SAND FOR WELL FRACTURING

FIELD OF THE INVENTION

The present invention relates to methods and systems for (i) recovering sand from sand dune mines or other source locations, (ii) processing the sand to remove pebbles, large grains, clay, and other contaminants, (iii) transporting the sand to wellsites or other distribution sites, and (iv) using the sand as a proppant material for well fracturing operations.

BACKGROUND OF THE INVENTION

Sand for well fracturing operations is recovered from source locations such as, e.g., dune sand mines and other sand mines. The raw sand from these sources will commonly include pebbles and larger particles which must be separated and removed from the sand. The raw sand will likely also include contaminants such as clay materials which can clog fractures and block gas and oil passages and must therefore be removed from the sand prior to use. Clay materials will typically be removed from the sand by attrition and water separation.

Heretofore, raw sand used for fracturing operations has typically been processed at the source location by first delivering the raw sand through a high capacity washing unit such as a mobile rinser. A mobile rinser can include two or three vibrating screens which operate to classify the sand by screening out and removing pebbles and oversized grains. The mobile rinser can also be used to remove undersized (fine) particles if desired. In addition, the mobile rinser has provided a water introduction point for the process, which has typically begun in the feedbox of the mobile rinser and has also included the use of water spray bars and/or nozzles positioned above each of the vibrating screens.

In order to liberate the clay material which clings to the sand, it has been necessary to provide an attrition scrubber at the source location downstream of the mobile rinser. In addition, prior to the attrition scrubber, the hydrated sand slurry produced in the mobile rinser has often been delivered to a sump and then pumped to a hydrocyclone which feeds a hydraulic classifier.

To remove the clay materials which are liberated from the sand in the attrition scrubber, the sand has been sent from the attrition scrubber to a sump where water has been added to bring the slurry to a density suitable for delivery to a separator such as a hydrocyclone. In the hydrocyclone, a frac sand product has been produced which exits via the underflow of the cyclone. The liberated clay and added water which are separated from the frac sand in the hydrocyclone have exited the hydrocyclone via the cyclone overflow.

Next, the frac sand from the hydrocyclone underflow has been fed to a dewatering unit, typically a dewatering screener, located at the sand source location. The frac sand from the dewatering unit has then been stockpiled at the sand source location using, e.g., a stacking conveyor.

Afterward, it has been necessary to load the frac sand from the sand piles formed at the sand source location in trucks, trailers, or other vehicles in order to transport the sand from the sand source location to remote distribution sites for stockpiling the sand and delivering the sand to wellsites for use in well fracturing operations.

The water recovered in the hydrocyclone and the dewatering screener has often been processed for reuse in the sand cleaning and classifying system by adding an anionic polymer material to the recovered water which causes the liberated clay materials in the water to agglomerate and separate from the water in a thickening tank (e.g., a stationary thickener or a mobile clarifier). The recovered water has also typically been further processed by delivering the recovered water to a settling pond. In addition, water has also be recovered from the separated solids in some cases by delivering the wet solids to another settling pond.

Unfortunately, the prior art system described above for recovering, processing, and transporting frac sand has had some significant, and costly, shortcomings and disadvantages.

In one respect, the attrition scrubbing stage and other stages of the process have been quite costly in terms of (i) the operating costs of the processing steps, (ii) the costs of buying, leasing, or hiring the processing units, and (iii) the cost of maintaining, repairing, and/or replacing the processing units or the components thereof when needed. In addition, whenever any stage of the system has been down for maintenance, repairs, or replacement, it has often been necessary to take the remainder of the processing system out of operation as well.

In another respect, the need to transport the processed frac sand in trucks, trailers, or other transport vehicles from the sand source location to a distant distribution site or wellsite has been disadvantageous for several reasons. In one respect, the fuel requirements for the sand trucks or other transport vehicles, and the emissions which they produce, have been quite excessive. Moreover, not only must the transport vehicles travel both to and from the distant distribution site, but the fuel requirements and emissions of the transport vehicles have often been further increased due to the fact that it has been necessary for the vehicles to follow circuitous routes along state highways and roads that have added many miles to the journey. In addition, the heavy traffic along these routes, caused in large part by the continuous travel of fleets of the frac sand vehicles, has been hazardous for both the drivers and the equipment.

Consequently, a need exists for an improved system and an improved method for recovering, processing, and transporting frac sand which (a) eliminate the need to use attrition scrubbers and/or other costly processing stages and units, (b) provide a high degree of particle-to-particle attrition for liberating clay materials from the frac sand, (c) reduce fuel consumption and emissions, (d) provide increased safety, and (e) eliminate the need for driving transport vehicles to and from distant distribution sites.

SUMMARY OF THE INVENTION

The present invention provides an improved method and an improved system for recovering, processing, and transporting sand for well fracturing operations. The improved method and the improved system satisfy the needs and alleviate the problems discussed above by (i) providing direct delivery of the sand from the sand source location to remote sites of distribution or use via sand slurry pipelines which are more direct, cost less, and provide a high degree of attrition for liberating clay from the sand, (ii) eliminating the need for an attrition scrubber to liberate the clay, and (iii) reducing fuel consumption and emissions and improving safety by eliminating the need for sand trucks to be driven long distances over hazardous routes.

In one aspect, there is provided a method of recovering sand at a sand source location, transporting the sand from the sand source location to a use and/or distribution location different from the sand source location, and liberating clay from the sand for use of the sand in a well fracturing operation. The method preferably does not use any truck, trailer, or other transport vehicle for transporting the sand from the sand source location to the use and/or distribution location.

In another aspect, the method preferably comprises the steps of: (a) screening and water rinsing the sand at the sand source location to produce a screened and rinsed sand product; (b) adding sufficient water in performing step (a), and/or adding water to the screened and rinsed sand product after step (a), to produce a pumping slurry; (c) delivering the pumping slurry to one or more slurry feed pumps at the sand source location which pump the pumping slurry into a sand slurry pipeline which extends from the sand source location to the use and/or distribution location; and (d) boosting the pumping slurry through the sand slurry pipeline to the use and/or distribution location using a plurality of slurry booster stages in the sand slurry pipeline, each of the slurry booster stages comprising a booster stage slurry pump.

In another aspect, each of the booster stage slurry pumps and each of the one or more slurry feed pumps preferably produces particle-to-particle attrition of the pumping slurry for liberating clay from the screened and rinsed sand product in the pumping slurry as the pumping slurry is delivered from the sand source location to the use and/or distribution location.

In another aspect, the method can preferably further comprise no attrition scrubber being used in the method within, upstream of, or downstream of the sand slurry pipeline.

In another aspect, the method can preferably further comprise removing at least most of a water content of the pumping slurry at the use and/or distribution location to produce (i) a frac sand product and (ii) a recovered water product comprising water and liberated clay.

In another aspect, the method can preferably further comprise: (i) pumping the recovered water product through a water return pipeline from the use and/or distribution location back to the sand source location; (ii) removing liberated clay from the recovered water product at the sand source location to produce a recycle water product; and (iii) using the recycle water product for screening and water rinsing and/or using the recycle water product as at least a portion of the additional water added to the screened and rinsed sand product.

Further aspects, features, and advantages will be apparent to those in the art upon reviewing the accompanying Drawing and upon reading the following Detailed Description of the Preferred Embodiments.

BRIEF DESCRIPTION OF THE DRAWING

The drawing illustrates an embodiment 2 of the inventive system and method.

DETAILED DESCRIPTION OF THE PREFERRED EMBODIMENTS

An embodiment 2 of the inventive method and system for recovering, processing, and transporting sand for fracturing operations is illustrated in the Drawing. The raw sand used in the inventive system and method 2 is recovered at a source location 4 from a sand mine (e.g., a sand dune mine) or from any other source.

The raw sand recovered from the sand mine or other source will preferably be initially screened and rinsed with water at the source location 4 in a screening and rinsing unit 6 to produce a screened and rinsed sand product. The screening and rinsing unit 6 will typically comprise (i) a feed hopper, (ii) a screen box having one or more, preferably two or three, vibrating screens therein, and (iii) a plurality of water spray rinse bars and/or nozzles positioned over each of the one or more vibrating screens.

The raw sand can be delivered to the feed hopper of the screening and rinsing unit 6 using a wheeled loader, a conveyor, or any other delivery system or device. The screening and rinsing unit 6 cleans the raw sand, screens out pebbles and other debris, and screens out grains which are larger than desired for use in fracturing operations. The screening and rinsing unit 6 can also screen-out fine particulates which are smaller than desired for fracturing.

By way of example, but not by way of limitation, a commercial screening and rinsing unit 6 which is well-suited for use in the inventive method and system 2 is a McCloskey S190 Mobile Rinser.

The screened and rinsed sand product produced by the screening and rinsing unit 6 is preferably delivered to a sump 8. The sump 8 can comprise a separate tank or other container and/or can be a tank provided as part of the screening and rinsing unit 6 (e.g., a tank positioned beneath the vibrating screens of the screening and rinsing unit 6).

Before pumping, additional water is preferably added to the screened and rinsed sand product as needed to produce a pumping slurry. As used herein and in the claims, the term "pumping slurry" refers to any sand slurry having a water content which is adequate for pumping the slurry.

The pumping slurry will preferably have a water concentration of at least 60% by weight based upon the total weight of the slurry. Any additional water needed for forming the pumping slurry can be added to the screened and rinsed sand product in, before, and/or after the sump 8. The amount of water added to the screened and rinsed sand product will more preferably be an amount sufficient to produce a dilute sand slurry having a water concentration of from 60% to 90% by weight and will most preferably be an amount sufficient to produce a slurry which is about 20% by weight sand and about 80% by weight water. As used herein and in the claims, the term "about" when used in reference to percentage concentrations means plus or minus five percentage points.

The pumping slurry is preferably delivered by gravity from the sump 8 to the suction of one or more slurry feed pumps 10 at the sand source location 4. The one or more slurry feed pumps 10 pump the pumping slurry into the inlet of the sand slurry pipeline 12. The sand slurry pipeline extends from the sand source location 4 to a use and/or distribution location 14 for the frac sand.

The sand slurry pipeline 12 will typically be formed of 12 inch polyethylene pipe but can alternatively be formed using any other size of pipe or any other pipe material. The sand slurry pipeline 12 can be of any length but will usually extend for a significant distance. Typically, the sand slurry pipeline will be at least five miles in length and may extend for a distance of up to fifty miles or more.

The sand slurry pipeline 12 will also preferably comprise a plurality of slurry booster stages 16 which are provided along the length of the pipeline 12 to boost the pumping slurry to the use and/or distribution location 14. Although any number of booster stages 16 can be used, the pipeline 12 will preferably include one or two booster stages 16 per mile. The number of booster stages 16 required for any given section of the pipeline 12 can depend, for example, on the degree to which the section slopes upward or downward, the slurry flow rate, the sand content of the dilute slurry, and the ID of the pipeline 12.

Each slurry booster stage 16 of the slurry pipeline 12 will preferably comprise (i) a booster stage slurry pump 18 and (ii) a booster stage sump 20 which receives the pumping slurry flowing through the slurry pipeline 12 and feeds the pumping slurry to the inlet of the booster stage slurry pump 18 by gravity. Baffles will also preferably be provided in the booster stage sumps 20 to prevent the pumping slurry from splashing out.

Each of the one or more slurry feed pumps 10 and each of the booster stage slurry pumps 18 used in the inventive method and system 2 will preferably be a high turbulence slurry pump such that the feed pump(s) 10 and booster stage pumps 18 will impart a sufficient degree of particle-to-particle attrition to the pumping slurry to liberate clay material which is still clinging to the screened and rinsed sand product. The amount of attrition provided by the slurry pumps 10 and 18 will preferably be sufficient to eliminate the need for an attrition scrubber in the inventive method and system 2. Consequently, in the inventive system and method 2, it is most preferred that no attrition scrubbing unit be used within, upstream of, or downstream of the sand slurry pipeline 12.

By way of example, but not by way of limitation, each of the one or more slurry feed pumps 10 and each of the booster stage pumps 18 can be a high-turbulence, flooded suction slurry pump which is commercially available from EDDY Pump Corporation.

In addition, if further clay liberation is necessary or desired, one or more static mixing sleeves 21 can also be included in the sand slurry pipeline 12 to provide further turbulence and particle-to-particle attrition.

When the pumping slurry arrives at the distant use and/or distribution location 14, at least most of the water content of the pumping slurry is removed from the slurry to produce (i) a frac sand product and (ii) a recovered water stream. The recovered water stream, which comprises water and liberated clay, will be pumped back to the sand source location 4 as explained below.

In the inventive system and method 2, most of the water is preferably removed from the pumping slurry at the use and/or distribution location by first pumping the pumping slurry through one or more cyclone separators 22. This yields (i) a cyclone overflow product stream which comprises the separated water and the liberated clay and (ii) a cyclone underflow product which comprises the frac sand product and any excess water which remains in the sand. Next, the frac sand product is delivered to a dewatering screener 24 to remove the remaining excess water therefrom. The water and liberated clay recovered from the cyclone separator(s) 22 and the remaining water recovered from the dewatering screener 24 are combined to form the recovered water stream which is then returned to the sand source location 4.

By way of example, but not by way of limitation, the dewatering screener 24 can be a mobile dewatering screener which includes, in a single unit, both (i) the one or more cyclone separators 22 and (ii) the dewatering screener system 24.

The frac sand product from the dewatering screener 24 is preferably delivered (using, e.g., a sand conveyor) to a high volume stacker 25 or other device for stockpiling the frac sand in the form of sand piles at the use and/or distribution location 14. If the use and/or distribution location 14 is a wellsite, the frac sand product will be added to a fracturing fluid at the wellsite 14, as needed, for a well fracturing operation.

On the other hand, if the use and/or distribution location 14 is a distribution site, the frac sand product which is stockpiled at the distribution site 14 can be loaded into trucks, trailers, or other transport vehicles for transporting the frac sand to one or more, typically a plurality of, wellsites which are preferably, but are not necessarily, located in the vicinity of the distribution site 14. At the wellsites, the frac sand will be added to fracturing fluids for use in well fracturing operations.

The recovered water stream produced at the use and/or distribution location 14 is preferably pumped back to the sand source location 4, via a water return pipeline 26, for reuse in the sand processing and slurry pipeline system 2. The water return pipeline 16 will include one or more initial charge pumps 28 and will also include as many return water booster pumps 30 as needed along the water return pipeline 16 for boosting the recovered water stream back to the sand source location 4.

When or after the recovered water stream returns to the sand source location, at least most of the liberated clay in the recovered water stream is removed from the recovered water stream to produce a recycle water product. The recycle water product is then preferably reused in the inventive system and method 2 (i) in the screening and rinsing unit 6 for screening and rinsing the raw sand and/or (ii) as at least a portion of the additional water which is added to the screened and rinsed sand product to form the pumping slurry which is pumped through the sand slurry pipeline 12.

At the sand source location 4, the liberated clay is preferably removed from the recovered water stream in a thickening tank 32, such as a stationary thickener or a mobile clarifier, by adding one or more polymers (preferably at least one anionic polymer) to the recovered water stream which is effective for producing a clarified water product by agglomerating the solids in the recovered water stream so that the agglomerated solids separate from the clarified water. In addition, further clay removal and/or the recovery of additional recycle water can be obtained by (i) delivering the clarified water product to a settling pond 34 at the sand source location 4 for additional clay removal and/or (ii) delivering the wet, agglomerated solids product to another settling pond 36 at the sand source location 4 for further water recovery.

Thus, the present invention is well adapted to carry out the objectives and attain the ends and advantages mentioned above as well as those inherent therein. While presently preferred embodiments have been described for purposes of this disclosure, numerous changes and modifications will be apparent to those in the art. Such changes and modifications are encompassed within the invention as defined by the claims

What is claimed is:

1. A method of recovering sand at a sand source location, transporting the sand from the sand source location to a use and/or distribution location different from the sand source location, and liberating clay from the sand for use of the sand in a well fracturing operation, the method not using any truck, trailer, or other transport vehicle for transporting the sand from the sand source location to the use and/or distribution location, and the method comprising steps of:

a) screening and water rinsing the sand at the sand source location to produce a screened and rinsed sand product;
b) adding sufficient water in performing step (a), and/or adding water to the screened and rinsed sand product after step (a), to produce a pumping slurry;
c) delivering the pumping slurry to one or more slurry feed pumps at the sand source location which pump the pumping slurry into a sand slurry pipeline which extends from the sand source location to the use and/or distribution location;
d) boosting the pumping slurry through the sand slurry pipeline to the use and/or distribution location using a plurality of slurry booster stages in the sand slurry pipeline, each of the slurry booster stages comprising a booster stage slurry pump,
(e) after step (d), removing at least most of a water content of the pumping slurry at the use and/or distribution location to produce a frac sand product and a recovered water product comprising water and liberated clay, and
(f) stockpiling the frac sand product in one or more piles at the use and/or distribution location, each said booster stage slurry pump and each of the one or more slurry feed pumps producing particle-to-particle attrition of the pumping slurry for liberating clay from the screened and rinsed sand product in the pumping slurry as the pumping slurry is delivered from the sand source location to the use and/or distribution location.

2. The method of claim 1 further comprising the pumping slurry having a water concentration of at least 60% by weight based upon a total weight of the pumping slurry.

3. The method of claim 1 further comprising, after step (a) and prior to step (c), delivering the screened and rinsed sand product to a sump at the sand source location.

4. The method of claim 1 further comprising each of the slurry booster stages additionally comprising a booster stage sump from which the pumping slurry is received by the booster stage slurry pump of the slurry booster stage.

5. The method of claim 1 further comprising the sand source location being a dune sand mine or other sand mine.

6. The method of claim 1 further comprising the sand slurry pipeline extending for a distance of at least five miles and having a number of the slurry booster stages which is equal to at least one of the slurry booster stages per mile of the sand slurry pipeline.

7. The method of claim 1 further comprising the sand recovered at the sand source location being screened and rinsed in step (a) at the sand source location in a screening and water rinsing unit comprising a feed hopper, a screen box having one or more vibrating screens therein, and a plurality of water spray rinse bars and/or nozzles for each of the one or more vibrating screens.

8. The method of claim 7 further comprising delivering the sand recovered at the sand source location into the feed hopper of the screening and water rinsing unit using a wheeled loader.

9. The method of claim 1 further comprising no attrition scrubber being used in the method within, upstream of, or downstream of the sand slurry pipeline.

10. The method of claim 1 further comprising delivering the pumping slurry through one or more static mixers in the sand slurry pipeline to produce an additional amount of attrition for liberating the clay.

11. The method of claim 1 further comprising the use and/or distribution location being a wellsite and the method further comprising a step, after step (f), of adding the frac sand product to a fracturing fluid at the wellsite.

12. The method of claim 1 further comprising the use and/or distribution location being a distribution site and the method further comprising steps, after step (f), of (g) loading the frac sand product into a truck, trailer, or other transport vehicle at the distribution site, (h) transporting the frac sand product in the truck, trailer, or other transport vehicle to a wellsite which is different from the distribution site, and (i) adding the frac sand product to a fracturing fluid at the wellsite.

13. A method of recovering sand at a sand source location, transporting the sand from the sand source location to a use and/or distribution location different from the sand source location, and liberating clay from the sand for use of the sand in a well fracturing operation, the method not using any truck, trailer, or other transport vehicle for transporting the sand from the sand source location to the use and/or distribution location, and the method comprising steps of:
a) screening and water rinsing the sand at the sand source location to produce a screened and rinsed sand product;
b) adding sufficient water in performing step (a), and/or adding water to the screened and rinsed sand product after step (a), to produce a pumping slurry;
c) delivering the pumping slurry to one or more slurry feed pumps at the sand source location which pump the pumping slurry into a sand slurry pipeline which extends from the sand source location to the use and/or distribution location;
d) boosting the pumping slurry through the sand slurry pipeline to the use and/or distribution location using a plurality of slurry booster stages in the sand slurry pipeline, each of the slurry booster stages comprising a booster stage slurry pump, and
e) after step (d), removing at least most of a water content of the pumping slurry at the use and/or distribution location to produce a frac sand product and a recovered water product comprising water and liberated clay, each said booster stage slurry pump and each of the one or more slurry feed pumps producing particle-to-particle attrition of the pumping slurry for liberating clay from the screened and rinsed sand product in the pumping slurry as the pumping slurry is delivered from the sand source location to the use and/or distribution location and the method further comprising at least most of the water content of the pumping slurry being removed at the use and/or distribution location in step (e) by:
delivering the pumping slurry through one or more cyclone separators to produce (i) a separated water stream, comprising water and liberated clay, which forms at least a portion of the recovered water product and (ii) a cyclone sand product and
delivering the cyclone sand product through a dewatering screener to remove an additional amount of water therefrom and produce the frac sand product.

14. The method of claim 13 further comprising the additional amount of water removed by the dewatering screener also forming a portion of the recovered water product.

15. A method of recovering sand at a sand source location, transporting the sand from the sand source location to a use and/or distribution location different from the sand source location, and liberating clay from the sand for use of the sand in a well fracturing operation, the method not using any truck, trailer, or other transport vehicle for transporting the sand from the sand source location to the use and/or distribution location, and the method comprising steps of:
a) screening and water rinsing the sand at the sand source location to produce a screened and rinsed sand product;

b) adding sufficient water in performing step (a), and/or adding water to the screened and rinsed sand product after step (a), to produce a pumping slurry;

c) delivering the pumping slurry to one or more slurry feed pumps at the sand source location which pump the pumping slurry into a sand slurry pipeline which extends from the sand source location to the use and/or distribution location;

d) boosting the pumping slurry through the sand slurry pipeline to the use and/or distribution location using a plurality of slurry booster stages in the sand slurry pipeline, each of the slurry booster stages comprising a booster stage slurry pump, and e) after step (d), removing at least most of a water content of the pumping slurry at the use and/or distribution location to produce a frac sand product and a recovered water product comprising water and liberated clay, each said booster stage slurry pump and each of the one or more slurry feed pumps producing particle-to-particle attrition of the pumping slurry for liberating clay from the screened and rinsed sand product in the pumping slurry as the pumping slurry is delivered from the sand source location to the use and/or distribution location and the method further comprising steps, following step (e), of:

pumping the recovered water product through a water return pipeline from the use and/or distribution location back to the sand source location, removing liberated clay from the recovered water product at the sand source location to produce a recycle water product, and using the recycle water product in steps (a) and/or (b).

16. The method of claim 15 further comprising said step of removing the liberated clay comprising adding at least one polymer to the recovered water product at the sand source location to produce a clarified water product and an agglomerate solids product which separates from the clarified water product.

17. The method of claim 16 further comprising (i) delivering the clarified water product to a settling pond at the sand source location and/or (ii) delivering the agglomerated solids product to a settling pond at the sand source location.

18. The method of claim 15 further comprising boosting the recovered water product through the water return pipeline using a plurality of water booster pump stages.

* * * * *